Dec. 11, 1951 B. D. LOUGHLIN 2,577,782

SUPERREGENERATIVE FREQUENCY-MODULATION RECEIVER

Filed June 7, 1947 4 Sheets-Sheet 1

INVENTOR.
BERNARD D. LOUGHLIN

BY John A. Harvey

ATTORNEY

INVENTOR.
BERNARD D. LOUGHLIN
BY John A. Harvey
ATTORNEY

INVENTOR.
BERNARD D. LOUGHLIN
BY John A. Harvey
ATTORNEY

SUPERREGENERATIVE FREQUENCY-MODULATION RECEIVER

Filed June 7, 1947 4 Sheets-Sheet 4

INVENTOR.
BERNARD D. LOUGHLIN
BY John A. Harvey
ATTORNEY

Patented Dec. 11, 1951 2,577,782

UNITED STATES PATENT OFFICE 2,577,782

SUPERREGENERATIVE FREQUENCY-MODULATION RECEIVER

Bernard D. Loughlin, Lynbrook, N. Y., assignor to Hazeltine Research, Inc., Chicago, Ill., a corporation of Illinois Application June 7, 1947, Serial No. 753,237

13 Claims. (Cl. 250—20)

Figure 1:
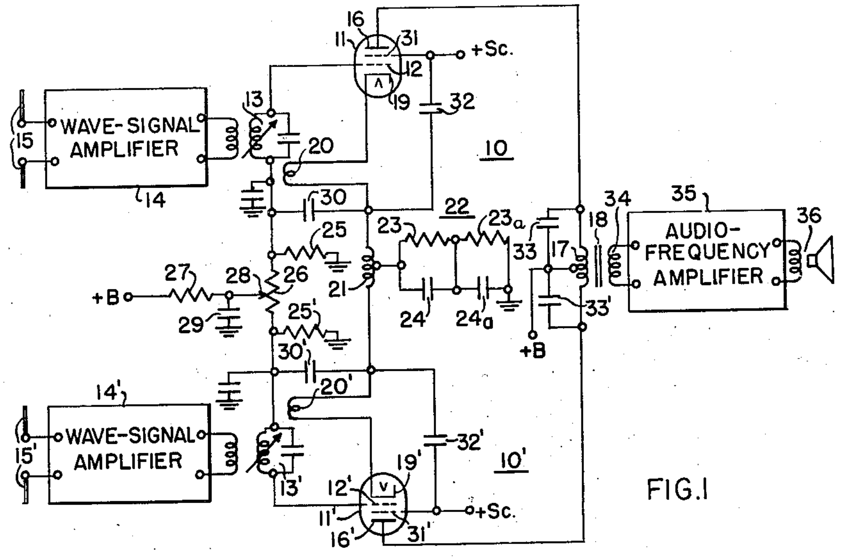

The present invention relates to superregenerative frequency-modulation receivers and, particularly, to such receivers which utilize superregenerative circuits adapted for operation in the saturation-level mode.

Superregenerative circuits have the desirable characteristics that they provide exceptionally high amplification of a received wave signal yet are of simple and inexpensive construction. They are particularly suitable for the reception of wave signals having relatively high frequencies of the order of 30 megacycles and above. Certain bands in the high-frequency spectrum are allocated to frequency-modulation transmissions. It has therefore been proposed that superregenerative circuits be employed to receive and amplify frequency-modulated wave signals. The term "frequency modulation" is used in the present specification and claims for simplicity, but it is to be understood that this term is to be interpreted as including any form of angular-velocity modulation including phase modulation.

One form of superregenerative frequency-modulation receiver heretofore proposed has utilized two superregenerators, either synchronously or alternately quenched during successive operating periods, which are coupled to a single tuned circuit or to individual side-tuned circuits. If a single tuned circuit is used, provision is made for periodically resonating the circuit, in synchronism with the operating periods of the superregenerators, at each of two frequencies equally spaced on either side of the mean frequency of the received frequency-modulated wave signal. The use of two tuned circuits permanently tuned to individual ones of the two side frequencies mentioned dispenses with the need for periodically shifting the resonant frequency of a single tuned circuit. In order that the receiver shall develop no output signal at the mean frequency of the received wave signal, corresponding to the condition of zero modulation, the two superregenerators are so arranged and adjusted that they develop equal output signals at the wave-signal mean frequency and their output signals are then differentially combined.

An arrangement of the type described is disclosed and claimed in applicant's copending application Serial No. 655,458, filed March 19, 1946, entitled "Wave-Signal Receiver." This receiver in one form employs two linear superregenerative circuits simultaneously or alternately quenched and two detectors individual to the circuits and so controlled that each detector is operative during a period corresponding to that of its associated regenerator. In another form, the receiver employs two superregenerative circuits adapted to operate in the saturation-level mode to dispense with the need for the separate detectors required for the linear superregenerators as well as to obtain the benefit of certain advantages created by the saturation-level mode of operation. Side-tuned circuits are employed with the saturation-level mode superregenerators and the latter are so adjusted and operated that the superregenerative frequency-response characteristic of each tuned circuit varies in accordance with a probability function to ensure that the amplitude of the output signal developed by the receiver varies linearily with the frequency of the received-modulated wave signal. The receiver includes a quench oscillator for simultaneously quenching the superregenerative circuits when operated in the saturation-level mode or when operated in the linear mode with side-tuned circuits or for alternately quenching the superregenerators where a single tuned input circuit is employed and its resonant frequency is periodically shifted as above described.

A superregenerative frequency-modulation receiver operating in the saturation-level mode and separately quenched by a quench oscillator is disclosed and claimed in applicant's copending application Serial No. 688,901, filed August 7, 1946, entitled "Superregenerative Superheterodyne Wave-Signal Receiver," now abandoned. In this receiver, the quench oscillator may also generate hereterodyne oscillations and the superregenerator tubes operate simultaneously as modulators and as regenerator tubes to heterodyne a received wave signal to an intermediate-frequency wave signal and thereafter to provide superregenerative amplification of the intermediate-frequency wave signal. By virtue of the saturation-level mode of operation, the regenerator tubes also derive in their output circuits the modulation components of the received wave signal.

An advantage attributed to the frequency-modulation type of system is that it enables the attainment of a higher signal-to-noise ratio than in an amplitude-modulation system. It is desirable for this purpose that a frequency-modulation receiver be insensitive to undesired amplitude modulation accompanying a received frequency-modulated wave signal. When a receiver possesses this amplitude insensitivity, it is conveniently referred to as having "amplitude rejection" properties; that is, it has the property of "rejecting" the amplitude modulation of the received wave signal in favor of its frequency modulation. Of the frequency-modulation wave-signal receivers disclosed in applicant's above-mentioned applications, the form of the receiver which operates the superregenerative circuits in the linear mode possesses amplitude rejection properties equivalent to that of a balanced frequency detector whereas the form of the receiver which operates the superregenerative circuits in the saturation-level mode possesses amplitude rejection properties to a much higher degree. This property of the last-mentioned type of receiver is dependent to some extent upon the fact that the output signals of the superregenerators are differentially combined, as by the use of a suitable transformer or the use of a phase inverter coupled to one of the superregenerator output circuits.

It would be desirable, however, to provide a superregenerative frequency-modulation receiver in which each of two superregenerative circuits employed therein possessed amplitude rejection properties in order that each superregenerative circuit might possess a high signal-to-noise ratio so that the output signal of either might be used alone when desired.

The operating characteristics of superregenerative circuits heretofore proposed may quickly become quite unstable with variations of operating conditions to which the superregenerative circuits are subjected in operation. For example, the operating characteristics may substantially change with variations of the value of conductance of their resonant input circuits due to antenna loading thereof, or by tuning the superregenerative circuits from one wave-signal station to another of different intensity, by change of the transconductance of the regenerator tubes, or by variations of energization of the superregenerative circuits, and the like. A superregenerative receiver adapted to receive amplitude-modulated wave signals and having exceptionally high stability of its operating characteristics over a wide range of variations of operating conditions is disclosed and claimed in applicant's copending application Serial No. 753,236, filed concurrently herewith, entitled "Superregenerative Receiver," and assigned to the same assignee as the present application. The superregenerative circuit of this receiver includes a regenerator tube having a gain control circuit and an output circuit and there is degeneratively included in common to these circuits an impedance which essentially maintains the average output-circuit current of the regenerator tube substantially constant with variations of all of the operating conditions except variations of the regenerization of the superregenerative circuit, for which condition the average anode current is caused to vary proportionately therewith. It would be desirable to provide this high operating stability in a frequency-modulation wave-signal receiver utilizing superregenerative circuits.

It is an object of the present invention, therefore, to provide a new and improved superregenerative frequency-modulation receiver characterized by high stability of its operating characteristics with variations of operating conditions to which the receiver is normally subjected in operation.

It is a further object of the invention to provide a new and improved superregenerative frequency-modulation receiver having a substantially improved ratio of its frequency-modulation response to its amplitude-modulation response and thus one having substantial amplitude rejection properties.

It is an additional object of the invention to provide a superregenerative frequency-modulation receiver employing two superregenerative circuits so intercoupled that a desired output signal may be taken from either superregenerative circuit or in push-pull relation from both if desired, or desired signals of quite different types may be simultaneously or selectively taken from individual ones of the superregenerative circuits, while at the same time each superregenerative circuit exhibits substantial amplitude rejection properties regardless of the fact that an output signal is taken from one or both of the circuits.

It is a further object of the invention to provide a self-quenched type of superregenerative frequency-modulation receiver having high sensitivity to the frequency modulation of a received wave signal yet having negligible response to undesired amplitude modulation thereof and one in which this amplitude rejection property is effected without regard to whether the amplitude modulation has a relatively low or relatively high frequency in the audible range or is of the transient-disturbance type having frequency components extending over a very wide frequency range including the audible range.

In accordance with a particular form of the invention, a superregenerative frequency-modulation receiver comprises a first self-quench type of superregenerative circuit, including a regenerative oscillatory circuit, for operation in the saturation-level mode and having a controlling circuit in which is derived a control signal varying with a characteristic of a saturation-level pulse developed in the superregenerative circuit, and a second superregenerative circuit including a regenerative oscillatory circuit and a controlled circuit which controls a pulse developed in the second superregenerative circuit. The controlled circuit is coupled to the aforementioned controlling circuit and is responsive to the derived control signal for rendering the last-mentioned pulse responsive to the aforementioned characteristic of the aforesaid pulse developed in the first superregenerative circuit. The first superregenerative circuit includes a self-quench network coupled to the second superregenerative circuit and providing for each of the superregenerative circuits alternate periods of positive and negative conductance in which the negative conductance periods of the first and second superregenerative circuits coincide over substantial portions thereof. The regenerative oscillatory circuits are so proportioned as to have substantially different resonant frequencies for providing for the first and second superregenerative circuits substantially different superregenerative frequency-response characteristics to cause the operation of at elast one of the superregenerative circuits by virtue of the aforementioned coupling to have an increased ratio of its frequency-modulation response to its amplitude-modulation response.

For a better understanding of the present invention, together with other and further objects thereof, reference is had to the following description taken in connection with the accompanying drawings, and its scope will be pointed out in the appended claims.

Figure 2:
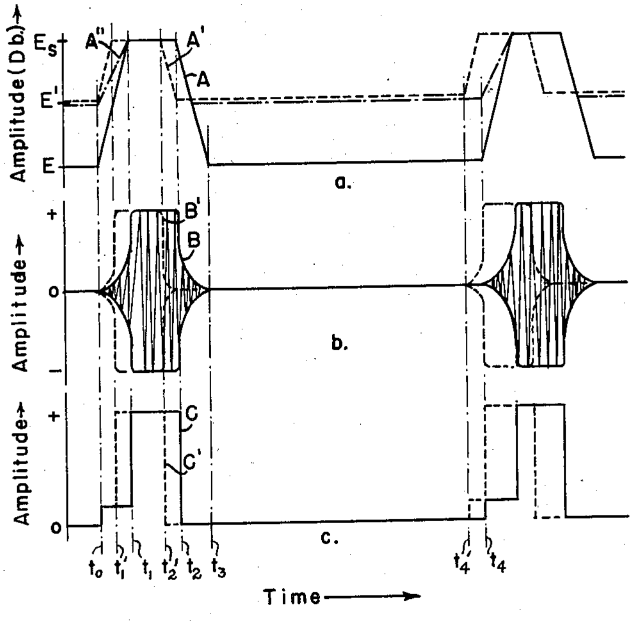
Figure 3:
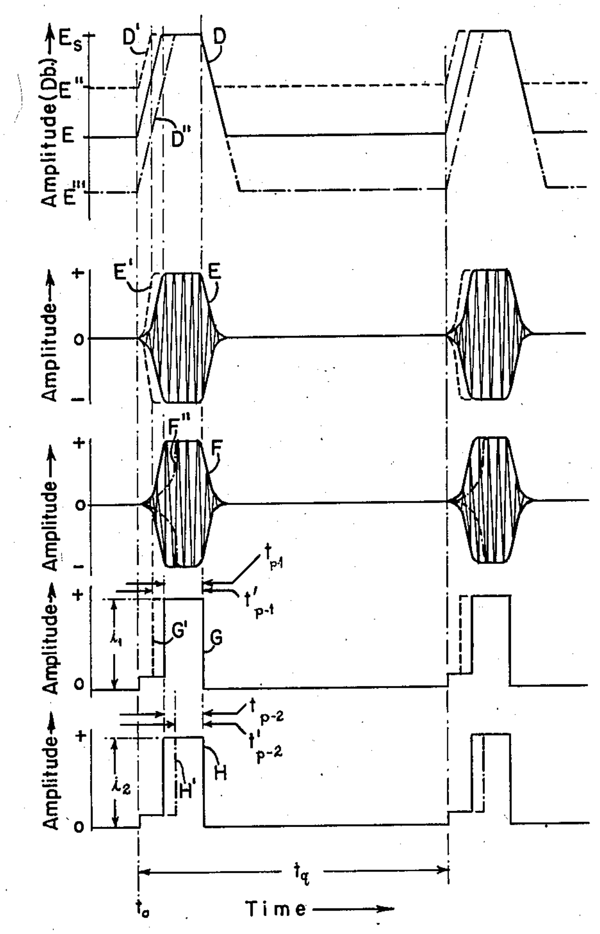
Figure 4:
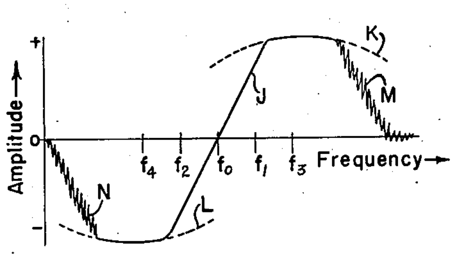
Figures 6, 7:
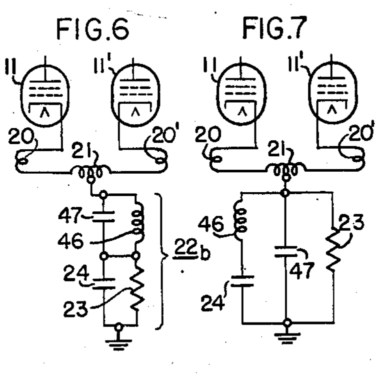
Figure 5:
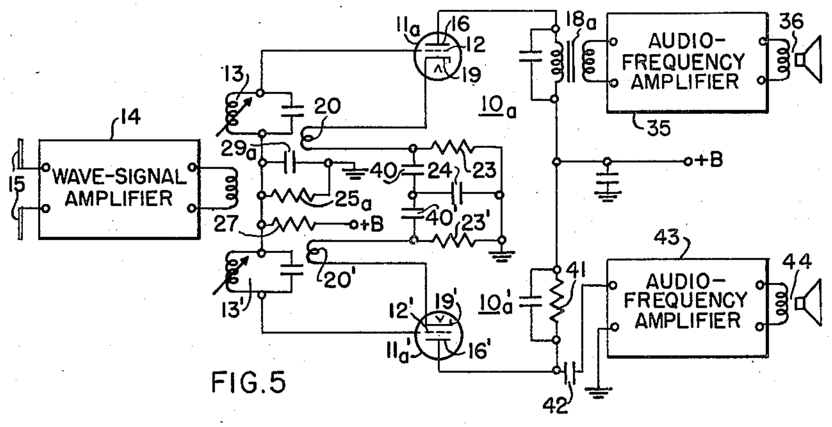
Figure 8:
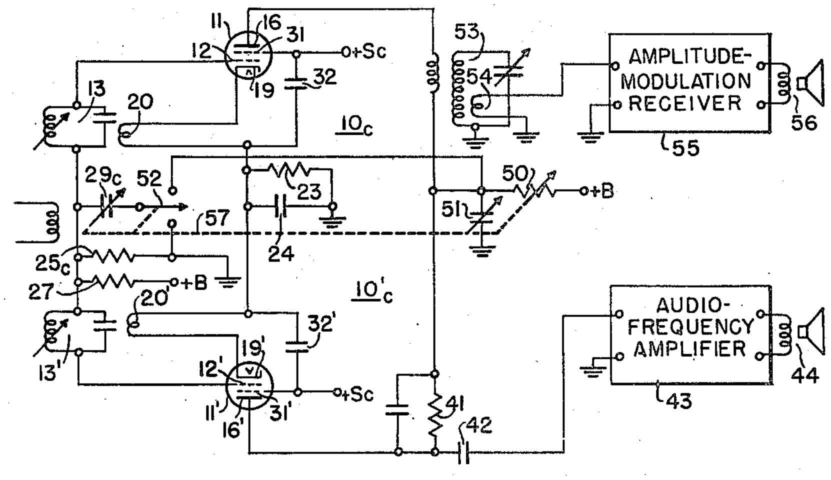
Figure 11:
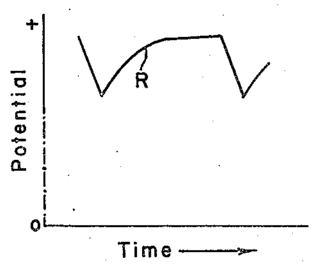
Figure 9:
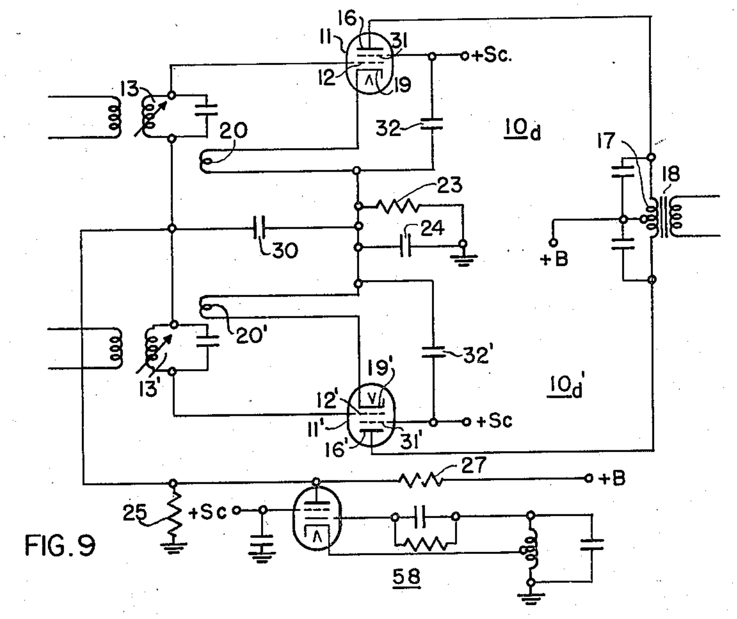
Figure 10:
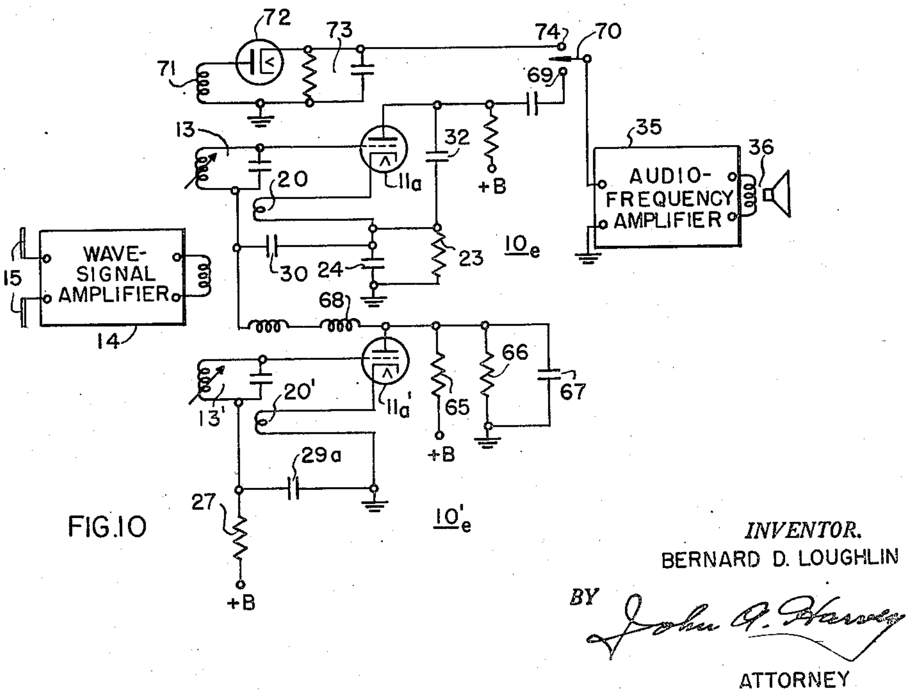

Referring now to the drawings, Fig. 1 is a circuit diagram, partly schematic, representing a complete superregenerative frequency-modulation receiver embodying the present invention in a particular form; Figs. 2, 3 and 4 graphically represent certain operating characteristics of the Fig. 1 receiver and are used as an aid in explaining its operation; Fig. 5 is a circuit diagram, partly schematic, of a complete superregenerative frequency-modulation receiver embodying the present invention in a modified form; Figs. 6 and 7 are circuit diagrams representing a common portion of each of the superregenerative circuits employed in the Fig. 1 arrangement and embody modified arrangements for attaining a desired control of the operation thereof; Figs. 8, 9 and 10 are circuit diagrams of portions of a complete superregenerative frequency-modulation receiver embodying the present invention in additionally modified forms; and Fig. 11 graphically represents certain operating characteristics of the Fig. 10 receiver.

Referring now more particularly to Fig. 1 of the drawings, the superregenerative frequency-modulation receiver having the circuit diagram there shown comprises a first superregenerative circuit 10 for operation in the saturation-level mode, which in a particular instance may be a logarithmic mode. The circuit 10 has a controlling circuit in which is derived from at least one energizing current thereof a control effect varying with a characteristic of the saturation-level mode of operation of the circuit 10. As will presently be pointed out in greater detail, the operating characteristic of the circuit 10 just mentioned may be any characteristic thereof which affects the value of its average energizing current, such as the duration of the saturation level, the quench frequency, or the interval required for the oscillations of the superregenerative circuit to build up to the saturation-level amplitude. An additional control effect may if desired be derived by the circuit 10 and is effective to stabilize the operating characteristic of this circuit against variations of operating conditions to which the circuit is normally subjected in operation, such as variations of energization of the superregenerative circuit, changes of transconductance of the superregenerator tube, changes of amplitude of a wave signal applied to the superregenerative circuit, and the like.

The superregenerative circuit 10 is of the self-quench type and includes a conductance control means comprising a regenerator tube 11 having a control electrode 12 coupled to an input or gain control circuit which includes a tuned input circuit 13. The latter is coupled to an output circuit of a wave-signal amplifier 14 of one or more stages, the latter having an input circuit coupled to an antenna system 15. While the amplifier 14 may comprise simply a radio-frequency amplifier of one or more stages, it is usually preferable for most applications that the unit 14 include one or two stages of radio-frequency amplification followed by an oscillator-modulator or mixer stage for converting the frequency of a received wave signal to a different or intermediate frequency. This permits the unit 14 to be tuned to any wave-signal frequency within a relatively wide range of such frequencies, as is usually desirable, without requiring that the tuned circuit 13 of the superregenerative circuit 10 be concurrently tuned with the unit 14 to the desired wave-signal frequency.

The regenerator tube 11 includes an anode 16 which is coupled through one-half of the primary winding 17 of an audio output transformer 18 to a source of energizing potential, indicated as +B. The regenerator tube 11 also includes a cathode 19 coupled to a cathode circuit comprising in series an inductor 20, inductively coupled to the inductor of the tuned input circuit 13, one-half of a center-tapped inductor 21, and a resistor-condenser network 22. The network 22 includes two series resistors 23 and 23a across which are connected respective condensers 24 and 24a. The value of the resistor 23 is sufficiently large that a unidirectional bias voltage developed thereacross, from the average value of regenerator-tube anode current flowing therethrough, is much larger than that required to bias the regenerator tube to anode-current cutoff; for example, a bias voltage twenty or more times as large as the cutoff bias. The resistor 23 and condenser 24 have a time constant short with relation to a selected range of frequency components appearing in the energy supplied from the source +B to the superregenerative circuit 10 yet long with relation to frequency components outside of this range for so regulating the energy supplied to the superregenerative circuit as substantially to stabilize the operating characteristics thereof against variations of the aforementioned operating conditions which tend to modify any frequency component within this range. The frequency range last mentioned preferably includes the audible frequency range extending from zero frequency to a frequency somewhat less than any self-quench frequency of the superregenerative circuit 10, although as will be more fully pointed out hereinafter the selected frequency range may if desired be much more restricted in scope and include essentially only the zero-frequency component of the energizing current supplied to the circuit 10. The zero-frequency component last mentioned comprises, of course, the unidirectional component of the energizing current. As will become more apparent hereinafter, the network 22 is included in common to the input or gain control circuit and the energizing or output circuit of the regenerator tube 11 so that the portion 23, 24 thereof provides a degenerative control effect for any frequency component in the selected range of components mentioned. The network portion 23a, 24a is a saturation-level-duration time-constant network across which is derived the control effect first mentioned above.

There is supplied to the control electrode 12 of the regenerator tube 11 a positive operating bias having a value slightly less than the positive unidirectional bias developed across the network 22. For this purpose, the lower terminal of the tuned circuit 13 is coupled to a voltage divider which is connected between a source of energizing potential, indicated as +B, and ground and comprises a fixed resistor 25, a selectable portion of a potential-divider resistor 26, and a fixed resistor 27. The potential divider 26 includes a manually adjustable contact 28 which is coupled to ground through a condenser 29 effective to maintain substantially constant the voltage of the contact 28 relative to ground. The lower terminal of the tuned circuit 13 is also coupled through a condenser 30 to the junction of the inductors 20 and 21, the condenser 30 having a relatively low value of impedance for currents of the frequency of the wave signal applied to the input circuit 13.

The regenerator tube 11 also includes a screen electrode 31 energized from a potential source, indicated as +Sc, and coupled through a wave-signal by-pass condenser 32 to the junction of the cathode inductors 20 and 21. That portion of the primary winding 17 of the output transformer 18 which is included in the energizing circuit of the superregenerative circuit 10 has connected in shunt thereto a wave-signal by-pass condenser 33.

The superregenerative frequency-modulation receiver also includes a second superregenerative circuit 10′ of the self-quench type and adapted to operate in the saturation-level mode, this circuit being essentially similar to the superregenerative circuit 10 and including similar circuit elements which are identified by similar reference numerals primed. The input tuned circuit 13′ of the second superregenerative circuit 10′ is likewise coupled through an amplifier 14′, essentially similar to the amplifier 14, to a wave-signal antenna 15′. In the second superregenerative circuit 10′, the cathode 19′ of its regenerator tube 11′ is coupled through the inductor 20′ and through an individual half of the inductor 20 to the network 22 so that the latter is common to the energizing circuits of both the first and second superregenerative circuits. By virtue of this, the network 22 is effective to cause corresponding ones of the operating characteristics thereof to vary in opposite senses with the frequency of a frequency-modulated wave signal applied to both superregenerative circuits while at the same time causing the corresponding operating characteristics to vary together in the same sense with variations of the previously mentioned operating conditions to which the circuits in common are normally subjected in operation. In particular, the energizing currents of the superregenerative circuits 10 and 10′ are of pulse wave form and the effect of the common network 22 is to cause a pulse characteristic of each of these energizing currents to vary in opposite senses with the frequency of the applied wave signal and to vary together in the same sense with variations of the operating conditions. Essentially, the input or gain control circuit of each of the superregenerative circuits 10 and 10′ may be considered a circuit to be controlled, and the output or energizing circuit of the other superregenerative circuit may be considered a controlling circuit in which is derived the control effects above mentioned. Since the control effects are developed across the network 22 and since this network is common to all of the input and output circuits of the superregenerative circuits 10 and 10′, the control effects derived thereacross by virtue of the energizing current of one superregenerative circuit are effective in the input or gain control circuit of the other superregenerative circuit to render an operating characteristic of the other circuit responsive to that characteristic of the first superregenerative circuit which causes a variation of the magnitude of the control effects.

At least one of the superregenerative circuits 10 and 10′ has an operating characteristic varying with the frequency of a frequency-modulated wave signal applied to both thereof to cause the operation of at least one of the superregenerative circuits by virtue of the intercoupling provided by the common network 22 to have an increased ratio of its frequency-modulation response to its amplitude-modulation response. In particular, the operating characteristics last mentioned may be, by way of example, the saturation-level duration or the oscillatory build-up interval of the one superregenerative circuit. To effect this variation of the operating characteristic of the one circuit with the frequency of the applied wave signal, the input tuned circuit 13 or 13′ of the one superregenerative circuit is tuned to one side of the mean frequency of the applied frequency-modulated wave signal and the other of the tuned circuits 13 or 13′ may then be tuned either to the wave-signal mean frequency or may be tuned to the opposite side thereof. Preferably, the tuned input circuits 13 and 13′ are tuned to frequencies equally spaced on opposite sides of the mean frequency of the applied wave signal to cause corresponding operating characteristics of the superregenerative circuits 10 and 10′ to vary in opposite senses with the frequency of the applied wave signal, whereby the operation of each of the superregenerative circuits by virtue of the intercoupling provided by the common network 22 has an increased ratio of its frequency-modulation response to its amplitude-modulation response.

The audio-frequency output transformer 18 includes a secondary winding 34 which is coupled to an input circuit of an audio-frequency amplifier 35 of one or more stages, the latter having an output circuit coupled to a loudspeaker 36.

In considering the operation of the superregenerative frequency-modulation receiver just described, it will be assumed that the cathode resistor 23 and condenser 24 of the network 22 are omitted to cause the superregenerative circuit 10 to operate as a conventional self-quench circuit and that the values of the potential-divider resistors 25, 26 and 27 are correspondingly selected to provide a suitable smaller positive bias for the control electrode 12 of tube 11. It will further be assumed for the moment that the regenerator tube 11′ is temporarily de-energized by any suitable means to de-energize the superregenerative circuit 10′.

Referring to the curves of Fig. 2, assume that at the moment $t_0$ the regenerative circuit 10 is ready to begin a new cycle of its operation and that there is applied to its input circuit 13 a wave signal having an amplitude E, Fig. 2*a*. As represented by solid-line curve A, and noting that this curve is plotted to a decibel scale on the axle of ordinates, the oscillations in the tuned input circuit 13 of the regenerative circuit 10 are regeneratively amplified in conventional manner during the oscillatory build-up interval $t_0-t_1$. The maximum amplitude of the oscillations is eventually limited by the saturation level $E_s$ of the superregenerative circuit which level, as is well known, has a value fixed by the circuit parameters. For reasons which will become more apparent hereinafter, the anode current of the regenerator tubes should increase during the saturation-level interval so that establishment of the saturation level $E_s$ by anode-current limiting is not desirable. The $E_s$ usually is fixed by the nonlinearity of the superregenerative circuit as in many conventional oscillators and by the action of the regenerator-tube control electrode becoming conductive on the positive peaks of the input-circuit oscillations and drawing sufficient current as to load the tuned input circuit. The oscillations in the input circuit 13 remain at this maximum amplitude level during the saturation-level interval $t_1-t_2$ of the superregenerative circuit. At the moment $t_2$ the superregenerative circuit quenches itself, in a manner presently to be explained, and the amplitude of the oscillations in the tuned input circuit 13 decreases exponentially as shown until at time $t_3$ they have their initial amplitude E. After an interval $t_3-t_4$, the superregenerative circuit has conditioned itself to initiate a new cycle of the operation described. The amplitude envelope of the oscillations in the tuned input circuit 13 for the operation described is represented by the solid-line curve B of Fig. 2*b*, and the anode current of the regenerator tube 11 has a pulse wave form as represented by the solid-line curve C of Fig. 2*c*.

The manner in which the superregenerative circuit effects self-quenching will now be briefly considered. Each pulse of the anode current, represented by curve C of the regenerator tube 11 charges the condenser $24_a$ in the cathode circuit thereof to develop across the condenser a positive voltage. At time $t_2$ the condenser $24_a$ has been charged sufficiently that the voltage developed thereacross is sufficiently larger than the positive unidirectional potential applied to the control electrode 12 of the regenerator tube 11 from the voltage divider 25, 26 and 27 that the control electrode biases the regenerator tube 11 to anode-current cutoff in the presence of the large-amplitude oscillations in resonant circuit 13. This causes the superregenerative circuit 10 to be quenched. After an interval $t_2-t_4$, the condenser $24_a$ discharges through the cathode resistor $23_a$ sufficiently that the decreased voltage across the condenser $24_a$ again permits the regenerator tube 11 to draw anode current. This terminates one quench cycle and initiates a new quench cycle of the superregenerative circuit.

The self-quench period of the superregenerative circuit is thus established by the sum of the oscillatory build-up interval $t_0-t_1$, the saturation-level interval $t_1-t_2$, and the discharge interval $t_2-t_4$. If any one of these three intervals changes, it will be apparent that the quench period also changes. The saturation-level interval $t_1-t_2$ is fixed, however, by the maximum amplitude of each pulse of anode current which in turn is constant and fixed by the constant value of the saturation level of the superregenerative circuit. Likewise, the discharge interval $t_2-t_4$ is fixed by the discharge time constant of the condenser $24_a$ and resistor $23_a$. Therefore, the quench period can vary only with the oscillatory build-up interval $t_0-t_1$. In a conventional self-quench superregenerative circuit, the build-up interval effectively becomes shorter with increasing amplitude of the applied wave signal. This is because the oscillations in its tuned input circuit then have increasingly larger initial amplitudes so that lesser intervals of time are required for their amplitude to build up to the saturation-level value of amplitude. For example, if it be assumed that in a conventional self-quench circuit the amplitude of the applied wave signal has a larger value E′, the oscillatory build-up interval is shortened to the value $t_0-t_1'$. This causes the termination of the saturation-level interval to be advanced to the moment $t_2'$ and the termination of the discharge interval to be advanced to the moment $t_4'$. By virtue of this, it will be apparent that the increased amplitude of the applied wave signal has caused the self-quench period of the conventional self-quench circuit to be decreased from its initial value $t_0-t_4$ to a new value $t_0-t_4'$.

Under the conditions assumed, namely that the circuit 10 is operated as a conventional self-quench superregenerative circuit, the manner of oscillation build-up in its tuned input circuit 13 for a wave signal having the amplitude E′ is now represented by the broken-line curve A′, the amplitude envelope of the oscillations by broken-line curve B′, and the anode current of the regenerator tube by the broken-line curve C′ of Fig. 2. Thus, in a conventional self-quench type of superregenerative circuit, the quench period decreases with increasing wave-signal amplitude. This decreasing quench period, or increasing quench frequency, causes the average value of anode current of the superregenerative circuit to increase for the reason that there are a greater number of current pulses in a given interval of time. Due to this variation of the average value of anode current with the amplitude of the applied wave signal, a conventional self-quench type of superregenerative circuit is able to derive the modulation components of an amplitude-modulated wave signal.

Assume now that the resistor 23 and condenser 24 are included in the network 22 and have the preferred values above mentioned; namely, that the resistor 23 has a value of resistance sufficiently large that the voltage developed thereacross by the average value of space current of the regenerator tube 11 is very much larger than the cutoff bias of the regenerator tube 11, for example of the order of twenty times or more, and that the condenser 24 has a value to provide with the resistor 23 a time constant short with relation to the selected range of frequency components appearing in the space current of the tube 11.

If it be now assumed that the amplitude of the wave signal applied to the tuned input circuit 13 increases from a value E to the value E′, there is an initial tendency to cause a more rapid oscillation build-up corresponding to curve A′ of Fig. 2*a* with correspondingly shorter quench period and consequent increase in the average value of the anode current. The condenser 24 is able to charge rapidly, over several quench cycles, with any increased value of the average anode current so that the average voltage developed across the condenser 24 likewise rapidly increases. This voltage is applied to the control electrode 12 of the regenerator tube 11 with such polarity that increasing values of the voltage effect a decrease of the transconductance of the latter tube so that a lesser value of negative conductance is thereupon developed in the tuned input circuit 13 by the regenerative action provided by the circuit 10. Consequently, under the assumed conditions, the oscillations in the tuned input circuit 13 build up more slowly in amplitude, as represented by the dot-and-dash curve A″ of Fig. 2. This causes the build-up interval $t_0-t_1$ of the superregenerative circuit to be substantially the same for a wave signal of amplitude E′ as for a wave signal of amplitude E. Solid-line curve B thus represents the amplitude envelope of the oscillations developed in the tuned input circuit 13 both for a wave signal of amplitude E and for an amplitude E′, and the solid-line curve C likewise represents the regenerator-tube anode current for wave signals having these different amplitudes. It will be apparent from this that the network 22 now so controls the operation of the superregenerative circuit 10 that the latter has a substantially constant self-quench frequency over a substantial range of amplitude variations of the applied wave signal and, further, that by virtue of this the average anode current of the regenerator tube 11 likewise remains substantially constant. Since the average value of the anode current therefore does not vary with the amplitude of the applied wave signal, the superregenerative circuit 10 no longer develops in its output circuit any amplitude-modulation components of the applied wave signal. That is, the superregenerative circuit 10 is now no longer responsive to amplitude variations of the applied wave signal and thus exhibits amplitude rejection properties.

By a similar analysis, it can readily be shown that the network 22 is effective so to control the operation of the superregenerative circuit 10 that the average anode current of the regenerator tube 11 and the average self-quench frequency of the circuit 10 are maintained substantially constant with variations of other operating conditions to which the superregenerative circuit is normally subjected in operation. This degenerative control thus stabilizes the circuit 10 for such operating conditions, for example, as variations of the energizing potential +B and variations of the transconductance of the regenerator tube 11 due to aging or other causes.

The foregoing described operation of the superregenerative circuit 10 under the assumption that the superregenerative circuit 10′ was de-energized applies in all respects to the operation of the latter when the former is similarly de-energized since the network 22 is common to both superregenerative circuits.

Assume now that both of the superregenerative circuits 10 and 10′ are concurrently energized, that their respective tuned input circuits 13 and 13′ are tuned to individual frequencies equally spaced on either side of the mean frequency of a frequency-modulated wave signal received, amplified, and applied thereto by the respective amplifiers 14 and 14′, and that the received wave signal is temporarily unmodulated and thus has its mean frequency. The superregenerative circuits 10 and 10′ are initially adjusted for balanced operation by adjustment of the contact 28 of the voltage divider 26, balance being established when the average anode currents of the regenerator tubes 11 and 11′ are equal.

When this balanced condition has been established, the amplifiers 14 and 14′ perform the important function of ensuring that any noise potentials which tend to control the operation of the superregenerative circuits are those applied by the amplifiers simultaneously to both of the superregenerative circuits, rather than the random noise potentials of the latter. For this purpose, the noise level in the output circuits of the amplifiers 14 and 14′ preferably should be 20 db to 30 db above the noise level in either of the superregenerative circuits 10 and 10′. The superregenerative circuits each have amplitude rejection properties for such simultaneously applied noise disturbances and consequently do not develop the amplitude-modulation components of this noise in their common output circuit.

In certain applications, it may be desirable for best signal-to-noise ratios to use an average quench frequency which is high relative to the maximum range of frequency deviation of the received wave signal and to restrict the band width of the wave-signal amplifiers 14 and 14′ to that just sufficient to pass the full frequency swing of the wave signal.

Under the assumed conditions, and assuming that the potential divider 26 has been adjusted for balanced operation of the superregenerative circuits 10 and 10′ as earlier mentioned, the superregenerative circuits reject any amplitude modulation accompanying the received frequency-modulated wave signal. Since it was previously assumed that the latter is temporarily unmodulated and thus has its mean frequency, the wave-signal amplitudes applied to the tuned input circuits 13 and 13′ of the superregenerative circuits have the same value E and the manner of oscillation build-up and decay in the tuned input circuits 13 and 13′ are similar and represented by the solid-line curve D of Fig. 3. The amplitude-envelope characteristic of the oscillations developed in the resonant circuit 13 is represented in Fig. 3 by solid-line curve E and that of the resonant circuit 13′ by solid-line curve F, solid-line curves E and F having similar configurations since the amplitude of the oscillation build-up and decay in the resonant circuits 13 and 13′ is substantially identical as stated with reference to curve D. The anode current of the regenerator tube 11 of the superregenerative circuit 10 is as represented by solid-line curve G of Fig. 3 and that of the regenerator tube 11′ of the superregenerative circuit 10′ is as represented by solid-line curve H. It may be noted that the average value of these currents is made equal by the foregoing described initial adjustment of the potential divider 26 and that the peak amplitudes $i_1$, $i_2$ and pulse durations $t_{p-1}$, $t_{p-2}$ of the anode-current pulses of the respective regenerator tubes 11 and 11′ are equal, due to the similarity of the superregenerative circuits and circuit constants and the similar manner of oscillation build-up and decay in their tuned input circuits 13 and 13′.

The manner in which the superregenerative circuits 10 and 10′ are caused to have a synchronous self-quench operation and hence alternate periods of positive and negative conductance in which the negative conductance periods of the two superregenerative circuits coincide over substantial portions thereof may well be considered at this point. It will be apparent that the charge of the condenser $24_a$, included in common to the cathode circuits of the regenerator tubes 11 and 11′, is dependent upon the sum of the integrated values of the anode-current pulses of the regenerator tubes. Expressed mathematically, and neglecting the component of charge provided by the initial low value of anode current which precedes each anode-current pulse, the increment of charge $Q_1$ due to the anode-current pulses of amplitude $i_1$ and duration $t_{p-1}$ of the regenerator tube 11 is approximately given by the relation:

$$Q_1 = i_1 t_{p-1} \quad (1)$$

Similarly, the increment of charge $Q_2$ received by the condenser $24_a$ due to the anode-current pulses of amplitude $i_2$ and duration $t_{p-2}$ of the regenerator tube 11′ is approximately given by the relation:

$$Q_2 = i_2 t_{p-2} \quad (2)$$

When corresponding pulses of the anode currents of the regenerator tubes 11 and 11′ charge the condenser $24_a$ sufficiently that the voltage developed across the latter biases the regenerator tubes to anode-current cutoff, these corresponding anode-current pulses are simultaneously terminated. It will be apparent that the total charge of the condenser $24_a$ required to bias the regenerator tubes to cutoff has a constant value K so that, from Equations 1 and 2, the following relation prevails:

$$i_1 t_{p-1} + i_2 t_{p-2} = K \quad (3)$$

After the condenser $24_a$ has charged sufficiently to bias the regenerator tubes 11 and 11′ to anode-current cutoff, the charge of the condenser is dissipated through the resistor $23_a$ until the voltage appearing across the condenser $24_a$ again permits anode-current flow in the regenerator tubes. Current is initiated in both regenerator tubes substantially simultaneously since the bias developed across condenser $24_a$ is common to the two tubes. It is thus apparent that the quench period $t_q$, Fig. 3, is constant and given by the relation:

$$\frac{i_1 t_{p-1}}{t_q}+\frac{i_2 t_{p-2}}{t_q}=K' \qquad (4)$$

where

K'=an arbitrary constant.

It was heretofore stated that the peak amplitudes $i_1$, $i_2$ and the pulse durations $t_{p-1}$, $t_{p-2}$ of the anode-current pulses are made equal by the similarity of the superregenerative circuits and circuit constants. Under this condition, it is apparent from Equation 4 considered in the light of the foregoing described degenerative operation that the quench period $t_q$ also is constant without regard to any amplitude modulation of the applied wave signal. It will now be shown that the anode-current pulse durations of the regenerator tubes vary by equal amounts but in opposite senses with the frequency of the applied wave signal, thus also to maintain the self-quench period $t_q$ of the superregenerative circuit substantially constant with regard to any frequency modulation of the wave signal.

Assume now that the frequency of the wave signal applied by the amplifiers 14 and 14' to the respective superregenerative circuits 10 and 10' changes in a direction approaching the resonant frequency of the tuned input circuit 13 of the superregenerative circuit 10. Due to the resonant characteristics of the input circuits 13 and 13', this assumed change of the wave-signal frequency causes the wave signal to be applied with greater amplitude E'', Fig. 3, to the superregenerative circuit 10 and with less amplitude E''' to the superregenerative circuit 10'. The manner of oscillation build-up and decay in the tuned input circuit 13 is now as represented by the broken-line curve D' of Fig. 3, the amplitude-envelope characteristic by broken-line curve E', and the anode current of the regenerator tube 11 by broken-line curve G'. The latter current now has a longer pulse duration $t_{p-1}'$ for a reason which will presently become apparent. Since the oscillations in the tuned input circuit 13 reach the saturation-level amplitude $E_s$ after a shorter interval following the beginning of the quench cycle at the moment $t_0$ than under the conditions first assumed, the anode-current pulses of the regenerator tube 11 also attain their peak amplitude at a correspondingly earlier moment in the quench cycle. This causes the cathode condenser $24_a$ to charge more quickly after initiation of the quench cycle than it did under the conditions first assumed and, in charging, the voltage developed across the condenser has the effect of reducing the trans-conductance of the regenerator tube 11' of the superregenerative circuit 10'. The oscillations in the tuned input circuit 13' of the latter thus start from an initial smaller amplitude E''' and build up somewhat more slowly than they otherwise would, so that the characteristic of the oscillation build-up and decay in this tuned circuit is now as represented by the dot-and-dash curve D'' of Fig. 3. The resultant amplitude-envelope characteristic of the oscillations in the tuned input circuit 13' is as represented by the broken-line curve F'', and the anode current of the regenerator tube 11' is now that represented by the broken-line curve H' from which it will be apparent that the pulses of anode current have a much shorter pulse duration $t_{p-2}'$ than before. The circuit adjustment is preferably such that the increase in average anode current of one regenerator is approximately equal to the decrease in average current of the other so that the termination of the anode-current pulses with relation to time $t_0$ does not change.

Thus, the assumed change of wave-signal frequency causes the anode current of the regenerator tube 11 and that of the regenerator tube 11' to have pulse durations varying by equal amounts but in opposite senses, that of tube 11 increasing and that of tube 11' decreasing. Since the quench frequency $t_q$ remains constant, as explained above in connection with Equation 4, the assumed change of wave-signal frequency results in an increase of the average anode current of the regenerator tube 11 and a decrease of the average anode current of the regenerator tube 11'. It is therefore apparent that the average anode current of each of the regenerator tubes 11 and 11' varies with the frequency of the applied wave signal so that the superregenerative circuits 10 and 10' are each effective to develop in their individual output circuits the modulation components of the applied frequency-modulated wave signal. These modulation components may be derived from the output circuit of either of the superregenerative circuits or, as shown in Fig. 1, may be derived in push pull by the use of an output transformer 18 having a balanced primary winding 17. The derivation of the modulation components in push pull, as in the Fig. 1 arrangement, has the advantage only that the amplitude of the modulation signal applied to the audio-frequency amplifier 35 is larger than would be the case where the modulation components are derived from only one of the superregenerative circuits. In this connection, it may be noted that there is no need to use the push-pull arrangement to balance out undesirable noise-disturbing components since each of the superregenerative circuits has amplitude rejection properties and neither therefore develops in its output circuit any amplitude - modulation noise - disturbing components of appreciable amplitude. The modulation components derived by the superregenerative circuits 10 and 10' are applied to the audio-frequency amplifier 35 wherein they are amplified and applied to the loudspeaker 36 for reproduction in conventional manner.

The pulse width of the anode current of one of the superregenerative circuits 10 and 10' preferably should decrease uniformly with the frequency deviation of the applied wave signal in one sense from its mean frequency while the pulse width of the anode current of the other superregenerative circuit should uniformly increase. It is the purpose of the cathode center-tapped inductor 21 to aid in obtaining this uniform and smooth variation in opposite senses of the anode-current pulse durations over a wide frequency-deviation range of the received wave signal. The inductor 21 may be considered as doing this by providing somewhat of a cancellation or neutralization of the tendency of the stronger pulsed superregenerative circuit to decrease the transconductance of the regenerator tube of the other superregenerative circuit.

For this purpose, it is preferable that the two halves of the inductor 21 be relatively tightly coupled with one another. A somewhat similar effect, but one not quite as satisfactory, may be obtained by resistively decoupling the superregenerative circuits 10 and 10'; namely, by replacing the inductor 21 with a center-tapped resistor each half of which is then effective to provide a small amount of degeneration of the superregenerative circuit in the cathode circuit of which it is included. Where the frequency-deviation range of the applied wave signal is relatively small or more limited than the currently used range of 150 kilocycles, the inductor 21 may be dispensed with completely as by connecting the inductors 20 and 20' directly to the ungrounded terminals of the resistor 23 and condenser 24. This has the effect of causing the average anode currents of the regenerator tubes 11 and 11' to vary more rapidly with the frequency of the applied wave signal. However, some distortion of the derived modulation-component wave form is caused should the applied wave signal deviate in frequency beyond the more limited frequency-deviation range mentioned.

The frequency-response characteristic of the Fig. 1 arrangement with the output circuits of the superregenerative circuits 10 and 10' arranged in push pull is represented by solid-line curve J of Fig. 4. The receiver develops no output at the mean frequency $f_0$ of the applied wave signal and has a relatively linear characteristic over the frequency-deviation range $f_1-f_2$ of the wave signal. The superregenerative frequency-response characteristics of the tuned input circuits 13 and 13' of each of the superregenerative circuits alone under self-quench action are indicated by the broken-line curves K and L, one having a resonant frequency of value $f_3$ and the other a resonant frequency of value $f_4$ equispaced on opposite sides of the mean frequency $f_0$ of the applied wave signal. It may be noted that side responses do not appear as the receiver is tuned on either side of the mean frequency of the applied wave signal. Rather, the modulation signal derived by the superregenerative circuits simply fades into the noise level, the relative amplitude of which with tuning is indicated by curves M and N. The value of the resistor $23_a$ of the pulse-determining network $23_a$, $24_a$ may be selected to provide a desired value of negative-conductance slope for the superregenerative circuits and thus a desired value of selectivity for the tuned input circuits 13 and 13' thereof.

A wave-signal receiver embodying the present invention is characterized by the relatively high sensitivity, for the frequency modulation of a received wave signal, which is exhibited by a separately quenched superregenerative circuit for ordinary amplitude modulation. That is, the receiver sensitivity is much higher than the sensitivity exhibited by a conventional self-quenched superregenerative circuit, the sensitivity of which is comparatively small due to the small percentage of change of the average anode current of the regenerator tube with modulation of a received wave signal.

The self-quench feature of the superregenerative circuits utilized in a receiver embodying the present invention inherently provides a relatively slow rate of change of the superregenerative-circuit input-circuit conductance during the oscillation build-up interval. This slow rate of change of conductance is caused by the saw-tooth wave form of the bias voltage developed across the elements $23_a$ and $24_a$ of the network 22 of the superregenerative circuits. A slow rate of change of conductance has the advantage that the selectivity of the superregenerative circuit is substantially increased. It has been found in a particular application using a relatively low quench rate of approximately 30 kilocycles that the selectivity characteristic of each superregenerative circuit is approximately 60 decibels lower at a frequency 400 kilocycles from the input tuned circuit resonant frequency than at the resonant frequency.

A frequency-modulation receiver embodying the present invention has the advantage, contrary to what ordinarily might be expected, that it produces less radiation of wave-signal energy than in a conventional frequency-modulation receiver employing a limiter stage. The reason for this is that the wave-signal amplitude usually developed in the output circuit of a limiter stage for good limiting action is of the order of 50 to 100 volts. In contrast, the maximum wave-signal amplitude developed in either of the superregenerative circuits employed in a wave-signal receiver embodying the present invention under the same conditions may be of the order of 10 to 20 volts peak and the wave signal has this amplitude only for a very short interval in each quench cycle so that the average wave-signal energy available for radiation over a quench cycle is very low and much less than in a conventional frequency-modulation receiver.

Since the average anode currents of the regenerator tubes 11 and 11' vary in opposite senses with the frequency of an applied wave signal, it will be apparent that differentially combined potentials developed by these currents may be utilized for conventional automatic-frequency-control purposes, as by applying the differential potential to an automatic-frequency-control system of conventional arrangement included in the amplifier units 14 and 14', or may be utilized for tuning-indication purposes, or the like. This has the interesting aspect that tubes 11 and 11' can be enclosed within one tube envelope in which there is also included a dual tuning-eye electrode arrangement with the fluorescent target thereof positioned at the end of the envelope as in the arrangement of the type 6AF6G tuning eye, whereby a single tube provides both a superregenerative frequency-modulation receiver and also a tuning indicator therefor.

In the receiver above described, as well as those hereinafter to be described, it may be desirable to provide separate diode detectors coupled to the tuned input circuits 13, 13' by which to derive the modulation components of the applied frequency-modulated wave signal, rather than to utilize the modulation components derived in the output circuits of the superregenerative circuits 10 and 10'. This may be accomplished by utilizing one or two averaging detectors in the manner disclosed in applicant's copending application Serial No. 655,458 above mentioned.

It will be apparent from the foregoing description of the Fig. 1 arrangement that the network 22 essentially constitutes a saturation-level-duration time-constant network which is common to the input or gain control circuit and to the output circuit of each of the regenerator tubes 11 and 11'. It is also effective to keep the average saturation-level duration substantially constant with variations of the applied wave-signal amplitude, variations of energizing potential +B, and variations like operating conditions to which the superregenerative circuits in common are normally subjected in operation. It will further be apparent that the superregenerative circuits 10 and 10′ are each responsive to the control effect derived across the network 22 and that by virtue of this a characteristic of the saturation-level mode of operation of one of the superregenerative circuits is caused for frequency modulation to vary in opposite sense from the corresponding characteristic of the other if these operating characteristics are the saturation-level-duration characteristics of the circuits, or to vary with amplitude modulation or B-supply variations in the same sense if the operating characteristics are of the saturation-level amplitude and oscillatory build-up interval characteristics thereof.

Fig. 5 is a circuit diagram, partly schematic, of a complete superregenerative frequency-modulation receiver embodying the present invention in a modified form essentially similar to that of Fig. 1, similar elements being designated by similar reference numerals and analogous elements by similar reference numerals with the subscript *a*. Whereas in Fig. 1 the network 22 is a common pulse-duration determining network for the two superregenerative circuits while at the same time providing audio and direct-current degeneration therefor, the present arrangement is one which separates the functions of the pulse determining network and the degeneration network. In the Fig. 1 arrangement, the network 22 does not stabilize the operating characteristics of the individual superregenerative circuits 10 and 10′ except on a composite basis, thereby rendering it desirable to use the potential divider 26 thereof for an initial balance adjustment. The present arrangement, on the other hand, is effective to stabilize the superregenerative circuits $10_a$ and $10_a'$ individually against variations of the energizing potential +B, changes of conductance $G_m$ of the regenerator tubes due to aging and the like, slow changes of the values of the circuit components over prolonged periods of operation, and variations of the applied wave-signal amplitude. To this end, the cathode 19 of the regenerator tube $11_a$ is coupled through the inductor 20 and a cathode resistor 23 to ground, while the cathode 19′ of the regenerator tube $11_a'$ similarly includes a cathode resistor 23′. A pair of condensers 40 and 40′ are connected in series between the ungrounded terminals of the cathode resistors 23 and 23′ and the condenser 24 is connected between the junction of the condensers 40 and 40′ and ground. The control electrodes 12 and 12′ of the respective regenerator tubes $11_a$ and $11_a'$ have a common bias arrangement comprising the resistors $25_a$ and 27 connected as a voltage divider across the bias source +B, the resistor $25_a$ having a shunt-connected condenser $29_a$ to provide therewith a network common to the superregenerative circuits $10_a$ and $10_a'$ and effective to control the common pulse durations of the anode-current pulses thereof.

For purposes of illustration, the output circuit of the wave-signal amplifier 14 is shown as being coupled in common to the resonant input circuits 13 and 13′ of the two superregenerative circuits although individual amplifiers may be used if desired as in the Fig. 1 arrangement. It was pointed out above that the derived modulation components of the applied frequency-modulated wave signal appear in the output circuit of either of the superregenerative circuits. For purposes of illustration in this regard, the present arrangement includes an output-circuit transformer $18_a$ for coupling the output circuit of the superregenerative circuit $10_a$ to an audio-frequency amplifier 35, while the output circuit of the superregenerative circuit $10_a'$ includes a load resistor 41 which is coupled by a condenser 42 to the input circuit of an audio-frequency amplifier 43 having its output circuit coupled to a loudspeaker 44.

The operation of the Fig. 5 receiver is essentially similar to that described in connection with Fig. 1 except that the superregenerative circuits $10_a$ and $10_a'$ have their operating characteristics individually stabilized by their respective cathode resistors 23 and 23′ against variations of operating conditions which tend to cause relatively slow variations of the average value of their individual anode currents, such as individual changes of the transconductance of the regenerator tubes. On the other hand, the circuits $10_a$ and $10_a'$ have their operating characteristics stabilized in common by the cathode network 23, 23′, 24, and 40, 40′ against undesired amplitude variations of the frequency-modulated wave signal applied thereto. The network comprising the resistor $25_a$ and condenser $29_a$ is common to the input circuits of the superregenerative circuits and the condenser $29_a$ thereof is a common pulse-determining element. That is, the condenser $29_a$ receives a charge during the saturation-level intervals of the superregenerative circuits by the action of the control electrodes 12 and 12′ in peak rectifying the oscillations developed in their associated tuned input circuits 13 and 13′. When the accumulated charge of the condenser $29_a$ becomes sufficient, the bias voltage developed across the condenser is effective to terminate simultaneously the saturation-level intervals of both of the superregenerative circuits by biasing the regenerator tubes $11_a$ and $11_a'$ to anode-current cutoff. Thereafter the charge in the condenser $29_a$ discharges through the resistor $25_a$ during a discharge interval until the voltage across the condenser $29_a$ decreases sufficiently to permit anode current again to flow in the regenerator tubes to initiate a new self-quench cycle. The frequency-modulation components derived in the output circuit of the superregenerative circuit $10_a$ are applied to the audio-frequency amplifier 35 wherein they are amplified and reproduced by the loudspeaker 36. The modulation components derived in the output circuit of the superregenerative circuit $10_a'$ are similarly applied to the audio-frequency amplifier 43 wherein they are amplified and applied to the loudspeaker 44 for reproduction in conventional manner.

For some applications, it may be desirable in an arrangement of the Fig. 5 type to stabilize the superregenerative circuits $10_a$ and $10_a'$ individually both for the direct-current component and also for modulation-signal frequency components appearing in their anode currents. This may be accomplished by omitting the cathode-circuit condensers 24, 40, and 40′ and by employing in their place an individual condenser connected across each of the cathode resistors 23 and 23′. The latter arrangement provides a resistor and parallel-connected condenser individual to the cathode circuits of the regenerator tubes $11_a$ and $11_a'$.

Fig. 6 is a circuit diagram of only a portion of a wave-signal receiver of the Fig. 1 type embodying a modified form of the invention, similar elements of Figs. 1 and 6 being designated by similar reference numerals and analogous elements by similar reference numerals with the subscript *b*. In the present arrangement, the network 22b includes two network sections by which the pulse-determining functions of the network are controlled by one network section whereas the direct-current degeneration and audio degeneration functions are performed by a second network section. The latter network section comprises the cathode resistor 23 and parallel-connected condenser 24, this network section being coupled in series with the other network section comprising an inductor 46 and parallel-connected condenser 47. The inductor 46 and condenser 47 have values selected such that these elements provide a resonant circuit having a resonant frequency somewhat below one-half of the self-quench frequency of the superregenerative circuits. With such an arrangement, the condenser 47 charges during the saturation-level interval to determine the duration of this interval and thereafter discharges through the inductor 46. When the voltage across the condenser 47 has decreased to a certain value during the discharge interval, the superregenerative circuits begin a new quench cycle of operation. The particular value of voltage to which the condenser 47 has to discharge before a new quench cycle is initiated is determined by the value of positive bias potential applied to the control electrodes of the regenerator tubes and by the voltage developed across the resistor 23 which together determine the self-quench frequency of the superregenerative circuit. The network portion comprising the resistor 23 and condenser 24 has values selected as in the Fig. 1 arrangement to provide both direct-current and audio degeneration. The condenser 47 may have a value selected to provide a desired slope of the negative-conductance characteristic of the superregenerative circuits and thereby a desired selectivity characteristic thereof.

Fig. 7 is a circuit diagram of a portion of a wave-signal receiver of the Fig. 1 type and is essentially similar to the arrangement of Fig. 6, similar elements being designated by similar reference numerals, except that the inductor 46 is connected in series with the condenser 24 across the resistor 23 and condenser 47 in parallel. The operation of the instant arrangement is essentially similar to that of Fig. 6 and will not be repeated.

Fig. 8 is a circuit diagram, partly schematic, of a portion of a complete wave-signal receiver embodying the present invention in a modified form having features essentially similar to features of the Figs. 1 and 5 receivers, elements of the present arrangement corresponding to similar elements of the latter arrangements being designated by similar reference numerals and analogous elements by similar reference numerals with the subscript *c*. In the present arrangement, the anodes of the regenerator tubes 11 and 11' are energized from the source of energizing potential +B through a series variable resistor 50 and variable shunt condenser 51. The condenser 29c in the input circuits of the regenerator tubes is of the variable type and is coupled through a switch 52 either to one terminal of the resistor 25c or to the common junction of the resistor 50 and condenser 51. It was stated in connection with the Fig. 1 arrangement that the modulation components of the applied wave signal were developed in the output circuits of each of the superregenerative circuits. It may be mentioned at this point that these modulation components are not only available as variations of the average component of anode current of each regenerator tube as explained in connection with the Fig. 1 arrangement, but are also available as variations of the energy of the quench frequency and quench-frequency harmonic components of the regenerator-tube anode currents. For purposes of illustration, the present arrangement thus includes a resonant circuit 53 coupled to the output circuit of the superregenerative circuit 10c and resonant at the quench frequency or a harmonic component thereof. The resonant circuit 53 is coupled by an inductor 54 to the input circuit of an amplitude-modulation receiver 55 of conventional arrangement, the latter having a loudspeaker 56 coupled to its output circuit.

When the switch 52 of the Fig. 8 receiver is operated to couple the condenser 29c to the resistor 25c, this condenser and resistor provide a pulse-determining circuit as described with relation to the Fig. 5 arrangement and provide essentially the same operation as the latter. In this connection, it may be noted that the cathode-circuit elements 23, 24 provide common direct-current and audio degeneration for the superregenerative circuits 10c and 10c' as in the Fig. 1 arrangement. Operation of the switch 52 to couple the condenser 29c to the junction of the resistor 50 and condenser 51 so changes the circuit arrnagement that the resistor 50 and condenser 51 now become the pulse-determining circuit common to the two superregenerative circuits 10c and 10c', the operation being otherwise essentially the same as though the condenser 29c and resistor 25c were the pulse-determining circuit. The values of the condenser 29c, the condenser 51, and the resistor 50 are, however, somewhat different when the pulse-determining circuit is included in the input circuits of the regenerator tubes than when included in their output circuits. For this reason, the latter-named elements are indicated as variable and are preferably mechanically connected for unicontrol operation with the switch 52 as indicated by the broken line 57. The quench-frequency component selected by the resonant circuit 53 is amplitude-modulated in accordance with the frequency modulation of the applied frequency-modulated wave signal, but is not modulated by any amplitude modulation of the latter. The selected quench-frequency component is thus suitable for application to the amplitude-modulation receiver 55, the latter operating to derive the amplitude-modulation components thereof in conventional manner. The operation of the instant receiver is otherwise essentially similar to that described in connection with the arrangements of Figs. 1 and 5 and will not be repeated.

A separately quenched form of superregenerative frequency-modulation receiver is represented by the circuit diagram of Fig. 9. The instant arrangement is essentially similar to that of Fig. 1 and similar circuit elements are designated by similar reference numerals with analogous elements by similar reference numerals having the subscript *d*. The superregenerative circuits 10d and 10d' of the present arrangement are not self-quenched as in the Fig. 1 receiver, but there are applied to the control electrodes 12 and 12' of the respective regenerator tubes 11 and 11' quench oscillations generated by a quench oscillator 58. The present arrangement can have no pulse-width determining circuit since the quench frequency must be that established by the quench oscillator 58. The cathode elements 23, 24 therefore provide only direct-current and audio degeneration as in the Fig. 1 arrangement by controlling the average value of the sum of the regenerator-tube average anode currents. They do this by controlling the oscillatory build-up interval much as in the Fig. 1 arrangement. The condenser 24 of the instant arrangement must have a value sufficiently large, however, that it does not receive sufficient charge during the saturation-level interval of the superregenerative circuits to terminate the saturation-level interval by biasing the regenerator tubes 11 and 11' to anode-current cutoff, but rather the saturation-level interval is terminated by the quench oscillations of the oscillator 58. The operation of the present arrangement is otherwise essentially similar to that of Fig. 1 and will not be repeated.

Fig. 10 represents a circuit diagram of an additionally modified form of the invention, essentially similar to the arrangements hereinbefore described, with the exception that one of the superregenerative circuits operates as a self-quenched circuit to develop a quench voltage which is applied to and controls the other superregenerative circuit operating as a separately quenched circuit. For this purpose, the superregenerative circuit 10' operates in the self-quench mode with a quench-frequency determining network, comprised by the resistor 27 and condenser $29_a$, in its input circuit. The anode of the tube $11_a'$ is energized from a source of potential, indicated as +B, through a voltage divider comprising series resistors 65 and 66. A condenser 67 is coupled across the resistor 66. The resistors 65 and 66 and the condenser 67 comprise a quench-voltage shaping network which is responsive to the anode current of tube $11_a'$ to develop across the resistor 66 and condenser 67 a quench voltage having the wave form represented by curve R of Fig. 11.

The derived quench voltage last mentioned is applied through an inductor 68 and the tuned circuit 13 of the superregenerative circuit $10_e$ to the control electrode of the regenerator tube $11_a$ to effect separate quench operation of this superregenerative circuit. The purpose of the inductor 68 will be described more fully hereinafter. The superregenerative circuit $10_e$ includes a degenerative cathode-circuit stabilizing network 23, 24. This circuit may be operated in the logarithmic mode, in which event the modulation components are developed in the output circuit thereof and are applied through a first contact 69 of a switch 70 to the input circuit of the audio-frequency amplifier 35. Alternatively, the superregenerative circuit $10_e$ may be operated in the linear mode. For this mode of operation, an inductor 71 is coupled to the inductor of the tuned circuit 13. The inductor 71 is serially included with a rectifier device 72 and anode load impedance 73 in a conventional modulation detector, the output circuit of which is coupled through a second switch contact 74 of the switch 70 to the input circuit of the amplifier 35.

When the superregenerative circuits $10_e$ and $10_e'$ are both operated in the logarithmic mode, it is desirable that they reach the saturation level at approximately the same moment to avoid interaction such as otherwise might be caused by the built-up amplitude of one circuit reaching an appreciable value prior to that of the other circuit. Neglecting for the moment the function of inductor 68, this may be accomplished by suitable selection of the value of the resistor 23 of the degenerative network 23, 24. If the inductor 68 is not used, the anode currents of the two superregenerator tubes $11_a$ and $11_a'$ have unequal anode-current pulse durations when the circuits are adjusted as last described. This condition would result in some unbalance of the superregenerative circuit characteristics, such for example as the band width of their input circuits caused by differences in their effective quench wave shapes.

It is the purpose of the inductor 68 to provide with the condenser 30 a time-delay network by which slightly to delay the application to the circuit $10_e$ of the quench voltage derived in the anode circuit of the superregenerative circuit $10_e'$. The delay provided by this network is selected to have such value that the two superregenerative circuits operating in the logarithmic mode terminate their anode-current pulses at substantially the same moment. When this condition is established, the resistor 23 of the degenerative network 23, 24 is then adjusted until the two superregenerative circuits again reach the saturation level at substantially the same moment in their oscillatory build-up interval. The anode-current pulses of the superregenerative circuits then have substantially the same pulse durations and occur in substantial coincidence. The two superregenerative circuits thereupon operate with substantially balanced or uniform operating characteristics.

Assume now that both circuits are operated in the logarithmic mode. When a frequency-modulated wave signal is applied to the superregenerative circuits, deviations of the wave-signal frequency by virtue of its modulation cause their anode-current pulses no longer to have equal pulse durations. The anode-current pulse durations of the superregenerative circuit $10_e'$ remain constant since its saturation-level interval is fixed by its circuit parameters. The anode-current pulses of the superregenerative circuit $10_e$, however, have a duration which increases and decreases from a mean value with deviations of the applied wave signal on either side of its mean frequency. The reason for this may be briefly stated as follows. Assume that the applied wave signal deviates in a direction from its mean frequency toward the resonant frequency of the tuned circuit 13 to cause the anode current of the regenerator tube $11_a$ to reach the saturation-level value sooner than when the wave signal has its mean value of frequency. At the same time, the wave-signal frequency is more distant from the resonant frequency of the tuned circuit 13' so that the superregenerative circuit $10_e'$ saturates later than normal and the quench voltage developed thereby is correspondingly delayed in point of time. This causes the anode-current pulses of tube $11_a$ to terminate later than normal. Thus these pulses under the assumed condition are initiated earlier and terminated later than when the wave signal has its mean value of frequency. Conversely for deviations of the wave signal in the opposite direction, it can be similarly shown that the anode current of tube $11_a$ reaches the saturation level later and terminates sooner than when the wave signal has its mean frequency. It consequently is apparent that the average anode current of the superregenerative circuit $10_e$ thus varies with the instantaneous frequency of the applied wave signal, whereby the modulation components of the wave signal are derived in the output circuit thereof and are applied through the switch contact 69 to the amplifier 35 for amplification and reproduction in conventional manner.

If the amplitude of the applied wave signal increases due to undesirable amplitude modulation, the anode currents of both superregenerator tubes $11_a$ and $11_a'$ reach the saturation level earlier but also terminate earlier than in the absence of such amplitude modulation so that the average anode current of the superregenerator $10_e$ remains relatively unaffected by such amplitude variations. For decreases of waved-signal amplitude, the anode currents of both superregenerator tubes reach the saturation-level value later and terminate later than in the absence of the wave-signal amplitude change and the average anode current again is unchanged. The receiver is thus seen to have good amplitude rejection properties.

Consider now the operation of the arrangement described when the superregenerative circuit $10_e$ is operated in the linear mode, the switch 70 being operated to close its contact 74. Assume that the applied wave signal deviates toward resonance with the input tuned circuit 13. The oscillations developed in the latter then increase more rapidly than normal and their ultimate amplitude is larger due both to the initial larger excitation of the tuned circuit 13 and also to the fact that the superregenerative circuit $10_e$ is quenched at a later moment than when the wave signal has its means frequency. For deviations of the wave signal in the opposite direction, the initial excitation of the tuned circuit 13 is smaller so that the ultimate amplitude of the oscillations developed thereacross is smaller both for this reason and also for the reason that the superregenerative circuit $10_e$ is quenched earlier than when the wave signal has its mean frequency. Consequently, the amplitude of the oscillations developed in the resonant circuit 13 and applied to the detector 71, 72 and 73 varies with the instantaneous frequency of the applied wave signal, whereby the modulation components of the wave signal are derived across the load impedance 73 of the detector and are applied to the amplifier 35.

If the amplitude of the applied wave signal increases when the circuit $10_e$ is operated in the linear mode, the amplitude of excitation of the tuned circuit 13 is larger but the oscillations developed therein are not able to reach a substantially larger amplitude than before the change of wave-signal amplitude due to the fact that the superregenerative circuit $10_e$ is quenched earlier by virtue of the correspondingly increased wave-signal amplitude applied to the circuit $10_e'$. The converse also is true so that the amplitude of the oscillations developed in the tuned circuit 13 has a value varying substantially only with the instantaneous frequency of the applied wave signal and independently of its amplitude.

From the above description of the invention, it will be apparent that a superregenerative frequency-modulation receiver embodying the invention has the advantages of good amplitude rejection and possesses high stability of its operating characteristics with variations of operating conditions to which the receiver is normally subjected in operation. There is the further advantage that the derived output signal may be taken as desired from either or both of the two superregenerative circuits, and desired output signals of quite different types may be simultaneously or selectively taken from individual ones of the superregenerative circuits. At the same time, the receiver exhibits substantial amplitude-modulation rejection properties regardless of the fact that an output signal is taken from one or both of the superregenerative circuits. A frequency-modulation receiver embodying the present invention also has the advantage that the receiver possesses amplitude rejection properties effected by a simplified and inexpensive circuit arrangement.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A superregenerative frequency-modulation receiver comprising, a first self-quench type of superregenerative circuit, including a regenerative oscillatory circuit, for operation in the saturation-level mode and having a controlling circuit in which is derived a control signal varying with a characteristic of a saturation-level pulse developed in said superregenerative circuit, a second superregenerative circuit including a regenerative oscillatory circuit and a controlled circuit which controls a pulse developed in said second superregenerative circuit, said controlled circuit being coupled to said controlling circuit and being responsive to said derived control signal for rendering said last-mentioned pulse responsive to said characteristic of said pulse developed in said first superregenerative circuit, said first superregenerative circuit including a self-quench network coupled to said second superregenerative circuit and providing for each said superregenerative circuits alternate periods of positive and negative conductance in which said negative conductance periods of said first and second superregenerative circuits coincide over substantial portions thereof, said regenerative oscillatory circuits being so proportioned as to have substantially different resonant frequencies for providing for said first and second superregenerative circuits substantially different superregenerative frequency-response characteristics to cause the operation of at least one of said superregenerative circuits by virtue of said coupling to have an increased ratio of its frequency-modulation response to its amplitude-modulation response.

2. A superregenerative frequency-modulation receiver comprising, a first self-quench type of superregenerative circuit, including a regenerative oscillatory circuit, for operation in the saturation-level mode and having a controlling circuit in which is derived from at least one energizing current of said superregenerative circuit a control signal varying with a characteristic of a saturation-level pulse developed in said superregenerative circuit, a second superregenerative circuit including a regenerative oscillatory circuit and a controlled circuit which controls a pulse developed in said second superregenerative circuit, said controlled circuit being coupled to said controlling circuit and being responsive to said derived control signal for rendering said last-mentioned pulse responsive to said characteristic of said pulse developed in said first superregenerative circuit, said first superregenerative circuit including a self-quench impedance network coupled to said second superregenerative circuit and providing for each of said superregenerative circuits alternate periods of positive and negative conductance in which said negative conductance periods of said first and second superregenerative circuits coincide over substantial portions thereof, said regenerative oscillatory circuits being so proportioned as to have substantially different resonant frequencies for providing for said first and second superregenerative circuits substantially different superregenerative frequency-response characteristics to cause the operation of at least one of said superregenerative circuits by virtue of said coupling to have an increased ratio of its frequency-modulation response to its amplitude-modulation response.

3. A superregenerative frequency-modulation receiver comprising, a first self-quench type of superregenerative circuit for operation in the saturation-level mode and including a regenerative oscillatory circuit and a conductance control means energized from an energizing circuit which includes an impedance effective to derive from the energy supplied to said means a control signal varying with a characteristic of a saturation-level pulse developed in said superregenerative circuit, a second superregenerative circuit including a regenerative oscillatory circuit and a controlled circuit which controls a pulse developed in said second superregenerative circuit, said controlled circuit being coupled to said impedance and being responsive to said derived control signal for rendering said last-mentioned pulse responsive to said characteristic of said pulse developed in said first superregenerative circuit, said first superregenerative circuit including a self-quench network coupled to said second superregenerative circuit and providing for each of said superregenerative circuits alternate periods of positive and negative conductance in which said negative conductance periods of said first and second superregenerative circuits coincide over substantial portions thereof, said regenerative oscillatory circuits being so proportioned as to have substantially different resonant frequencies for providing for said first and second superregenerative circuits substantially different superregenerative frequency-response characteristics to cause the operation of at least one of said superregenerative circuits by virtue of said coupling to have an increased ratio of its frequency-modulation response to its amplitude-modulation response.

4. A superregenerative frequency-modulation receiver comprising, a first self-quench type of superregenerative circuit for operation in the saturation-level mode and including a regenerative oscillatory circuit and a regenerator tube having input and output circuits in one of which is derived a control signal varying with a characteristic of a saturation-level pulse developed in said superregenerative circuit, a second superregenerative circuit including a regenerative oscillatory circuit and a controlled circuit which controls a pulse developed in said second superregenerative circuit, said controlled circuit being coupled to said one circuit and being responsive to said derived control signal for rendering said last-mentioned pulse responsive to said characteristic of said pulse developed in said first superregenerative circuit, said first superregenerative circuit including a self-quench network coupled to said second superrengenerative circuit and providing for each of said superregenerative circuits alternate periods of positive and negative conductance in which said negative conductance periods of said first and second superregenerative circuits coincide over substantial portions thereof, said regenerative oscillatory circuits being so proportioned as to have substantially different resonant frequencies for providing for said first and second superregenerative circuits substantially different superregenerative frequency-response characteristics to cause the operation of at least one of said superregenerative circuits by virtue of said coupling to have an increased ratio of its frequency-modulation response to its amplitude-modulation response.

5. A superregenerative frequency-modulation receiver comprising, a first self-quench type of superregenerative circuit for operation in the saturation-level mode and including a regenerative oscillatory circuit and a regenerator tube having a cathode-circuit impedance across which is derived a control signal varying with a characteristic of a saturation-level pulse developed in said superregenerative circuit, a second superregenerative circuit including a regenerative oscillatory circuit and controlled circuit which controls a pulse developed in said second superregenerative circuit, said controlled circuit being coupled to said cathode circuit and being responsive to said derived control signal for rendering said last-mentioned pulse responsive to said characteristic of said pulse developed in said first superregenerative circuit, said first superregenerative circuit including a self-quench network coupled to said second superregenerative circuit and providing for each of said superregenerative circuits alternate periods of positive and negative conductance in which said negative conductance periods of said first and second superregenerative circuits coincide over substantial portions thereof, said regenerative oscillatory circuits being so proportioned as to have substantially different resonant frequencies for providing for said first and second superregenerative circuits substantially different superregenerative frequency-response characteristics to cause the operation of at least one of said superregenerative circuits by virtue of said coupling to have an increased ratio of its frequency-modulation response to its amplitude-modulation response.

6. A superregenerative frequency-modulation receiver comprising, a first self-quench type of superregenerative circuit, including a regenerative oscillatory input circuit, for operation in the saturation-level mode and having a controlling circuit in which is derived a control signal varying with a characteristic of a saturation-level pulse developed in said superregenerative circuit, a second superregenerative circuit including a regenerative oscillatory input circuit and controlled circuit which controls a pulse developed in said second superregenerative circuit, said controlled circuit being coupled to said controlling circuit and being responsive to said derived control signal for rendering said last-mentioned pulse responsive to said characteristic of said pulse developed in said first superregenerative circuit, said first superregenerative circuit including a self-quench network coupled to said second superregenerative circuit and providing for each of said superregenerative circuits alternate periods of positive and negative conductance in which said negative conductance periods of said first and second superregenerative circuits coincide over substantial portions thereof, said regenerative oscillatory circuits being so proportioned as to have resonant frequencies on individual sides of the mean frequency of a frequency-modulated wave signal applied to both thereof to cause the operation of at least one of said superregenerative circuits by virtue of said coupling to have an increased ratio of its frequency-modulation response to its amplitude-modulation response.

7. A superregenerative frequency-modulation receiver comprising, a first self-quench type of superregenerative circuit, including a regenerative oscillatory circuit, for operation in the saturation-level mode and having a controlling circuit in which is derived a control signal varying with a characteristic of a saturation-level pulse developed in said superregenerative circuit, a second superregenerative circuit including a regenerative oscillatory circuit and a controlled circuit which controls a pulse developed in said second superregenerative circuit, said controlled circuit being coupled to said controlling circuit and being responsive to said derived control signal for rendering said last-mentioned pulse responsive to said characteristic of said pulse developed in said first superregenerative circuit, said first superregenerative circuit including a self-quench network coupled to said second superregenerative circuit and providing for each of said superregenerative circuits alternate periods of positive and negative conductance in which said negative conductance periods of said first and second superregenerative circuits coincide over substantial portions thereof, said regenerative osillatory circuits being so proportioned as to have substantially different resonant frequencies for providing for said first and second superregenerative circuits substantially different superregenerative frequency-response characteristics to cause the operation of at least one of said superregenerative circuits by virtue of said coupling to have an increased ratio of its frequency-modulation response to its amplitude-modulation response, and means responsive to the energizing current of at least one of said superregenerative circuits for stabilizing the operating characteristics of at least said one superregenerative circuit against variations of operating conditions to which said receiver is normally subjected in operation.

8. A superregenerative frequency-modulation receiver comprising, a first self-quench type of superregenerative circuit for operation in the saturation-level mode and including an energizing source therefor, a regenerative oscillatory circuit and means responsive to any frequency component in a selected range of frequency components appearing in the energy supplied from said source to said circuit yet having much less response to frequency components outside of said range for so regulating the energy supplied to said circuit as substantially to stabilize the operating characteristics of said circuit against variations of operating conditions which tend to modify any frequency component in said range, a second superregenerative circuit energized from said source for operation in the saturation-level mode and including a regenerative oscillatory circuit and a circuit to be controlled coupled to said means for so regulating the energy supplied from said source to said second circuit as substantially to stabilize the operating characteristics of said second circuit against variations of operating conditions which tend to modify any frequency component in said range, a control circuit common to said superregenerative circuits for controlling a characteristic of energizing-current pulses thereof to maintain a substantially constant average value of said last-mentioned characteristic and for providing for each of said first and second superregenerative circuits alternate periods of positive and negative conductance in which said negative conductance periods of said first and second superregenerative circuits coincide over substantial portions thereof, said regenerative oscillatory circuits beso proportioned as to have substantially different resonant frequencies for providing for said first and second superregenerative circuits substantially different superregenerative frequency-response characteristics to cause the operation of at least one of said superregenerative circuits by virtue of said coupling to have an increased ratio of its frequency-modulation response to its amplitude-modulation response.

9. A superregenerative frequency-modulation receiver comprising, a first self-quench type of superregenerative circuit for operation in the saturation-level mode and including an energizing source therefor and a regenerative oscillatory circuit, a resistor and effectively parallel-connected condenser included in the energizing circuit of said superregenerative circuit and having a time constant short with relation to a selected range of frequency components appearing in the energy supplied from said source to said superregenerative circuit yet long with relation to frequency components outside of said range for so regulating the energy supplied to said superregenerative circuit as substantially to stabilize the operating characteristcs thereof against variations of operating conditions which tend to modify any frequency component in said range, a second superregenerative circuit energized from said source for operation in the saturation-level mode and including a regenerative oscillatory circuit and a circuit to be controlled coupled to said resistor and condenser and responsive to a control signal derived thereacross for so regulating the energy supplied to said second superregenerative circuit as substantially to stabilize the operating characteristics thereof against variations of operating conditions which tend to modify any frequency component in said range, a control circuit common to said superregenerative circuits for controlling a characteristic of energizing-current pulses thereof to maintain a substantially constant average value of said last-mentioned characteristic and for providing for each of said first and second superregenerative circuits alternate periods of positive and negative conductance in which said negative conductance periods of said first and second superregenerative circuits coincide over substantial portions thereof, said regenerative oscillatory circuits being so proportioned as to have substantially different resonant frequencies for providing for said first and second superregenerative circuits substantially different superregenerative frequency-response characteristics to cause the operation of at least one of said superregenerative circuits by virtue of said coupling to have an increased ratio of its frequency-modulation response to its amplitude-modulation response.

10. A superregenerative frequency-modulation receiver comprising, a first self-quench type of superregenerative circuit, including a regenerative oscillatory circuit, for operation in the saturation-level mode and having a controlling circuit in which is derived a control signal varying with the self-quench frequency of said superregenerative circuit, and a second superregenerative circuit for operation in the saturation-level mode and including a regenerative oscillatory circuit and a controlled circuit which controls a pulse developed in said second superregenerative circuit, said controlled circuit being so coupled to said controlling circuit as in response to said derived control signal to provide for said first and second superregenerative circuits alternate periods of positive and negative conductance in which said negative conductance periods of said first and second superregenerative circuits coincide over substantial portions thereof, said regenerative oscillatory circuits being so proportioned as to have substantially different resonant frequencies for providing for said first and second superregenerative circuits substantially different superregenerative frequency-response characteristics to cause the operation of at least one of said superregenerative circuits by virtue of said coupling to have an increased ratio of its frequency-modulation response to its amplitude-modulation response.

11. A superregenerative frequency-modulation receiver comprising, a first self-quench type of superregenerative circuit including a regenerative oscillatory circuit and a saturation-level-duration controlling time-constant network across which is derived a control signal varying with a saturation-level pulse characteristic of said superregenerative circuit, a second superregenerative circuit, including a regenerative oscillatory circuit, for operation in the saturation-level mode and having a saturation-level control circuit which controls a pulse developed in said second superregenerative circuit, said control circuit being so coupled to said network as in response to said derived control signal to render a characteristic of said last-mentioned pulse responsive to said pulse characteristic of said first superregenerative circuit and to provide for said first and second superregenerative circuits alternate periods of positive and negative conductance in which said negative conductance periods of said first and second superregenerative circuits coincide over substantial portions thereof, said regenerative oscillatory circuits being so proportioned as to have substantially different resonant frequencies for providing for said first and second superregenerative circuits substantially different superregenerative frequency-response characteristics to cause the operation of at least one of said superregenerative circuits by virtue of said coupling to have an increased ratio of its frequency-modulation response to its amplitude-modulation response.

12. A superregenerative frequency-modulation receiver comprising, a first self-quench type of superregenerative circuit including a regenerative oscillatory circuit and a saturation-level-duration controlling time-constant network across which is derived a control signal varying with a saturation-level pulse characteristic of said superregenerative circuit, and a second self-quench type of superregenerative circuit for operation in the saturation-level mode and including a regenerative oscillatory circuit and said time-constant network in common with said first superregenerative circuit for causing the magnitude of said control signal to vary with the combined values of corresponding saturation-level pulse characteristics of said first and second superregenerative circuits, and for providing for each thereof alternate periods of positive and negative conductance in which said negative conductance periods of said first and second superregenerative circuits coincide over substantial portions thereof, said regenerative oscillatory circuits being so proportioned as to have substantially different resonant frequencies for providing for said first and second superregenerative circuits substantially different superregenerative frequency-response characteristics to cause the operation of at least one of said superregenerative circuits by virtue of said coupling to have an increased ratio of its frequency-modulation response to its amplitude-modulation response.

13. A superregenerative frequency-modulation receiver comprising, a first self-quench type of superregenerative circuit for operation in the saturation-level mode and including a regenerative oscillatory circuit and a regenerator tube having a cathode-circuit resistor and parallel-connected condenser across which there is derived a control signal varying with a characteristic of a saturation-level pulse developed in said superregenerative circuit, said control signal being effective to maintain the average self-quench frequency of said superregenerative circuit substantially constant with variations of the amplitude of a frequency-modulated wave signal applied thereto and substantially constant with variations of operating conditions to which said superregenerative circuit is normally subjected in operation, and a second self-quench type of superregenerative circuit, including a regenerative oscillatory circuit, for operation in the saturation-level mode and having a controlled circuit which controls a pulse developed in said second superregenerative circuit, said controlled circuit being so coupled to said controlling circuit as in response to said derived control signal to provide for said first and second superregenerative circuits alternate periods of positive and negative conductance in which said negative conductance periods of said first and second superregenerative circuits coincide over substantial portions thereof and to stabilize the operating characteristics of said second superregenerative circuit against variations of said operating conditions, said regenerative oscillatory circuits being so proportioned as to have substantially different resonant frequencies for providing for said first and second superregenerative circuits substantially different superregenerative frequency-response characteristics to cause the operation of at least one of said superregenerative circuits by virtue of said coupling to have an increased ratio of its frequency-modulation response to its amplitude-modulation response.

BERNARD D. LOUGHLIN.

REFERENCES CITED

The following references are of record in the file of this patent:

UNITED STATES PATENTS

| Number | Name | Date |
|---|---|---|
| 1,899,684 | Haigis | Feb. 28, 1933 |
| 2,212,182 | Paddle | Aug. 20, 1940 |
| 2,230,465 | McAllister | Feb. 4, 1941 |
| 2,351,193 | Crosby | June 13, 1944 |
| 2,363,651 | Crosby | Nov. 28, 1944 |
| 2,373,616 | Sziklai | Apr. 10, 1945 |
| 2,412,710 | Bradley | Dec. 17, 1946 |
| 2,416,794 | Crosby | Mar. 4, 1947 |

OTHER REFERENCES

Radio Detectors for F. M. Receivers, Radio, October 1945, pages 18, 19 and 20.